United States Patent [19]
Ford, Jr. et al.

[11] Patent Number: 5,935,514
[45] Date of Patent: *Aug. 10, 1999

[54] METHOD FOR EXTRUSION OF POWDER MIXTURES USING SUPERCRITICAL FLUIDS

[75] Inventors: C. Edward Ford, Jr., Painted Post, N.Y.; Ronald E. Johnson, Tioga, Pa.; Dell J. St. Julien, Watkins Glen, N.Y.

[73] Assignee: Corning Incorporated, Corning, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 09/003,745

[22] Filed: Jan. 7, 1998

Related U.S. Application Data

[60] Provisional application No. 60/035,989, Jan. 23, 1997.

[51] Int. Cl.$^6$ .................................................. B29C 47/00
[52] U.S. Cl. ...................... 264/630; 264/631; 264/638; 264/639; 264/669; 264/177.11; 264/177.12; 419/36; 419/37; 419/41; 419/67

[58] Field of Search .............................. 264/42, 43, 45.9, 264/630, 638, 177.11, 177.12, 631, 639, 109, 669; 419/41, 67, 36, 37

[56] References Cited

U.S. PATENT DOCUMENTS

| 5,568,652 | 10/1996 | Wu | 264/630 |
|---|---|---|---|
| 5,766,522 | 6/1998 | Daly et al. | 264/13 |
| 5,884,138 | 3/1999 | Chalasani | 419/41 |

*Primary Examiner*—James Derrington
*Attorney, Agent, or Firm*—L. Rita Herzfeld

[57] ABSTRACT

A method of making a shaped article involves forming an aqueous mixture comprising inorganic powder material, supercritical fluid, organic binder component a portion of which is essentially insoluble in water, and aqueous vehicle, and extruding the mixture into a shaped article.

5 Claims, 1 Drawing Sheet

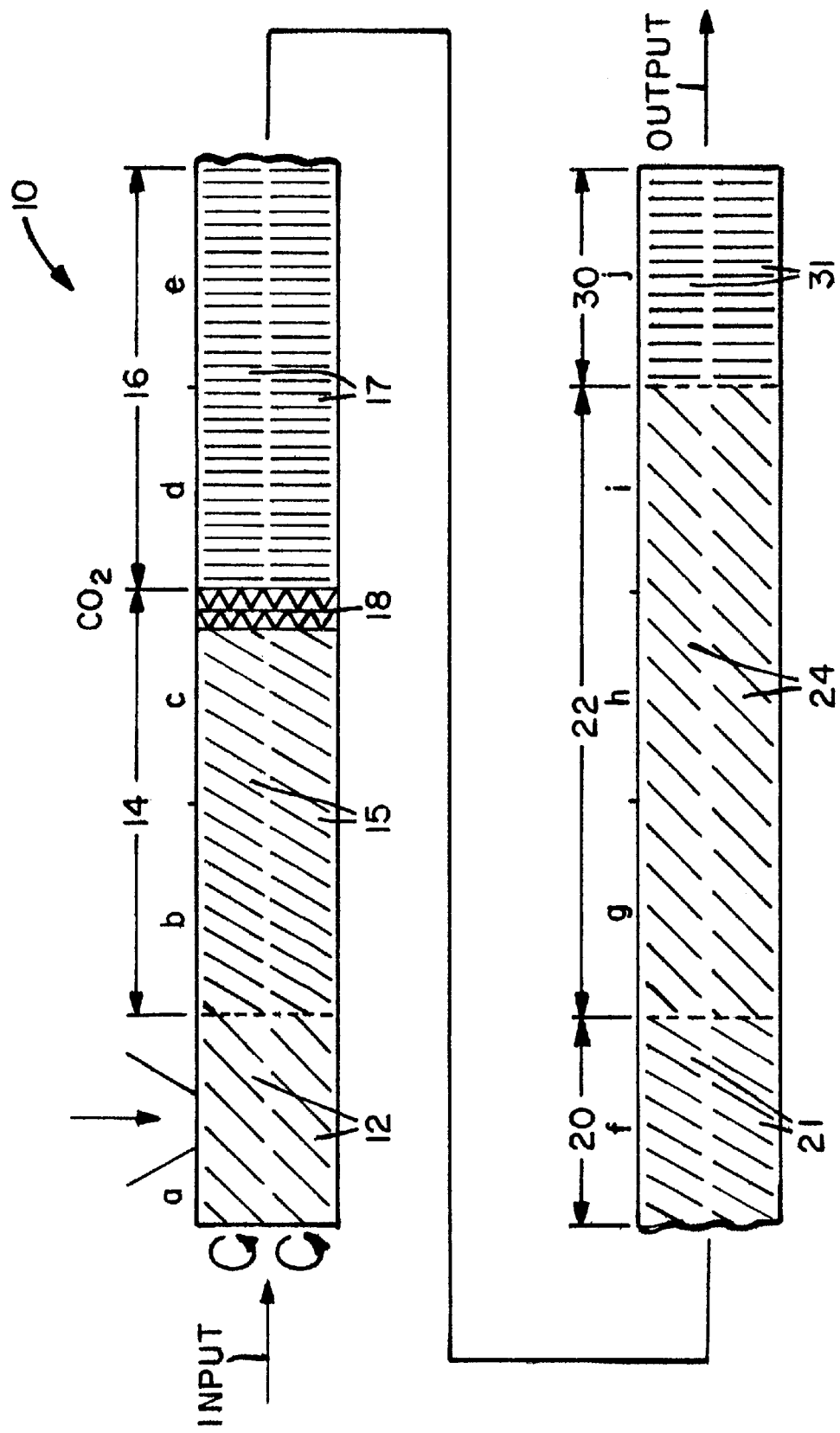

METHOD FOR EXTRUSION OF POWDER MIXTURES USING SUPERCRITICAL FLUIDS

This application claims the benefit of U.S. Provisional Application No. 60/035,989, filed Jan. 23, 1997, entitled IMPROVED METHOD FOR EXTRUSION OF POWDER MIXTURES USING SUPERCRITICAL FLUIDS, by C. Edward Ford, Ronald E. Johnson, and Dell J. St. Julien.

This invention relates to an improvement in an extrusion process for highly filled powder mixtures having a water insoluble organic binder, in which supercritical fluids such as supercritical $CO_2$ or $N_2O$ are mixed with the water insoluble organic binder to enhance flowability. Extrusion is done at lower pressures and torque than would otherwise be possible without the supercritical fluid, and extrudates are stiffer due to loss of the supercritical fluid upon exit from the extrusion die.

BACKGROUND OF THE INVENTION

Powder mixtures having a cellulose ether binder are used in forming articles of various shapes. For example ceramic or metal powder mixtures are formed into honeycombs which are used as substrates in catalytic and adsorption applications. The mixtures must be well blended and homogeneous in order for the resulting shaped body to have good integrity in size and shape and uniform physical properties. The mixtures have organic additives in addition to the binders. These additives can be surfactants, lubricants, and dispersants and function as processing aids to enhance wetting thereby producing a uniform batch.

A major and ongoing need in extrusion of bodies from highly filled powder mixtures, especially multicellular bodies such as honeycombs is to extrude a stiffer body without causing higher pressures. The need is becoming increasingly critical as thinner walled cellular structures are becoming more in demand for various applications. Thin walled products with current technology are extremely difficult to handle without causing shape distortion. Rapid-setting characteristics are important for honeycomb substrates. If the cell walls of the honeycomb can be solidified quickly after forming, the dimension of the greenware will not be altered in subsequent cutting and handling steps. This is especially true for a fragile thin-walled or complex shaped product, or a product having a large frontal area.

The present invention fills the need for rapid setting of extruded bodies which is especially beneficial for thin walled honeycombs.

SUMMARY OF THE INVENTION

In accordance with one aspect of the invention, there is provided a method of making a shaped article involves forming an aqueous mixture comprising inorganic powder material, supercritical fluid, organic binder component a portion of which is essentially insoluble in water, and aqueous vehicle, and extruding the mixture into a shaped article.

BRIEF DESCRIPTION OF THE DRAWING

The FIGURE is a schematic diagram of a typical extruder for extruding a plasticized batch with supercritical $CO_2$.

DETAILED DESCRIPTION OF THE INVENTION

The present invention makes use of supercritical fluids such as supercritical $CO_2$ or supercritical $N_2O$ in extrusion of highly filled inorganic powder aqueous mixtures having an organic binder component at least a portion of which is insoluble in water and sufficiently miscible with the supercritical fluid so as to cause softening of the water-insoluble binder. Uniformly mixing the supercritical fluid with the other mixture components results in lower extrusion pressures and torque, while producing a stiffer extrudate as the supercritical fluid is lost upon exit from the extrusion die. Especially suited as the water insoluble binder are waxes, and these are normally used in conjunction with water soluble organic binders such as cellulose ethers, some of which are thermally gellable. The extrusion temperature can be below the melting point of the wax, and therefore higher melting waxes can be employed at lower extrusion temperatures than is currently possible. The use of higher melting waxes allows selection of harder waxes, and in consequence is expected to result in stiffer extrudates. Up to this time, if waxes with high melting point, or virtually any water insoluble binder in a solid state at the extrusion temperature, were added to the extrusion batch, the torque and pressure would increase. Stiffness would increase also, but the challenge or the need is to increase stiffness without increasing torque and/or pressure. It is the extrudate stiffness, not batch stiffness internal to the extruder—that is referred to here. In order to avoid the high torque and/or pressures, waxes were limited to those which either were molten at the extrusion temperature, were soft and lubricating, or were made soft by other batch additives such as oleic acid. In the prior art, softening within the extruder tended also to result in softening of the extrudate.

Hard, higher melting waxes could not be employed with thermally gelling water soluble binders such as methylcellulose, as the temperature required to melt the wax would likely be high enough to be above the gelation point of the methylcellulose. Methylcellulose or hydroxypropyl methylcellulose binders commonly employed exhibit batch gelation temperatures ranging from 30 to 60° C. Therefore waxes with melt points above 60° C. could not be employed unless irreversibly softened, thereby losing their advantage in stiffness.

The present invention overcomes the disadvantages of batch inhomogeneity, high extrusion pressures and torques brought about by extruding at or above the gel point of thermally gelling cellulose ether binders such as methylcellulose, hydroxypropyl methylcellulose, and hydroxyethyl methylcellulose. Lower temperature extrusion according to this invention results in better batch homogeneity while producing stiffer extrudates with less pressure and torque.

The Supercritical Fluid

The supercritical fluid is preferably supercritical $CO_2$ or supercritical $N_2O$, with supercriti al $CO_2$ being the most preferred. The miscibility of most polymers and higher molecular weight waxes is relatively low in non-supercritical fluids. For example, with $CO_2$, it is usually <1% by weight. This is not so in the supercritical state. The extruder must be maintained at a temperature and pressure that enhances the miscibility or solubility of the water-insoluble binder system in the supercritical fluid, which in turn, enhances its flowability. It is conceivable that liquid $CO_2$ can be used. However, few polymers or waxes are very soluble in non-supercritical $CO_2$.

The Powder Material

Typical powders are inorganics such as metal, ceramic, glass ceramic, glass, and molecular sieve, or combinations of these.

The invention is especially suitable for use with metal and ceramic powders.

Any sinterable metal or metal composition can be used in the practice of the present invention. Especially suited are iron group metal, chromium, and aluminum compositions, with the preferred iron group metal being iron. Especially preferred is Fe, Al, and Cr. For example, Fe5-20Al5-40Cr, and Fe7-10Al10-20Cr powders with other possible additions are especially suited. Some typical compositions of metal powders are disclosed in U.S. Pat. Nos. 4,992,233, 4,758,272, and 5,427,601 which are herein incorporated by reference as filed. U.S. Pat. No. 4,992,233 relates to methods of producing porous sintered bodies made from metal powder compositions of Fe and Al with optional additions of Sn, Cu, and Cr. U.S. Pat. No. 5,427,601 relates to porous sintered bodies having a composition consisting essentially of in percent by weight about 5 to about 40 chromium, about 2 to about 30 aluminum, 0 to about 5 of special metal, (to about 4 of rare earth oxide additive and the balance being iron group metal, and unavoidable impurities such as eg., Mn or Mo, with the preferred iron group metal being iron. When rare earth oxide is present, the special metal is at least one of Y, lanthanides, Zr, Hf, Ti, Si, alkaline earth metal, B, Cu, and Sn. When no rare earth oxide is present, the special metal is at least one of Y, lanthanides, Zr, Hf, Ti, Si, and B, with optional additions of alkaline earths, Cu, and Sn.

In general, the powder material is fine powder (in contrast to coarse grained materials) some components of which can either impart plasticity, such as clays, when mixed with a vehicle such as water, or which when combined with the organic binder can contribute to plasticity.

By ceramic, glass ceramic and glass ceramic powders is meant those materials as well as their pre-fired precursors. By combinations is meant physical or chemical combinations, eg., mixtures or composites. Examples of these powder materials are cordierite, mullite, clay, talc, zircon, zirconia, spinel, aluminas and their precursors, silicas and their precursors, silicates, aluminates, lithium aluminosilicates, alumina silica, feldspar, titania, fused silica, nitrides, carbides, borides, eg., silicon carbide, silicon nitride, soda lime, aluminosilicate, borosilicate, soda barium borosilicate or mixtures of these, as well as others.

Especially suited are ceramic materials, such as those that yield cordierite, mullite, or mixtures of these on firing, some examples of such mixtures being, for example, about 55% to about 60% mullite, and about 30% to about 45% cordierite, with allowance for other phases, typically up to about 10% by weight. Some ceramic batch material compositions for forming cordierite that are especially suited to the practice of the present invention are those disclosed in U.S. Pat. No. 3,885,977 which is herein incorporated by reference as filed.

In accordance with a preferred embodiment, one composition which ultimately forms cordierite upon firing is as follows in percent by weight, although it is to be understood that the invention is not limited to such: about 33 to about 41, and most preferably about 34 to about 40 of aluminum oxide, about 46 to about 53 and most preferably about 48 to about 52 of silica, and about 11 to about 17 and most preferably about 12 to about 16 magnesium oxide.

The powders can be synthetically produced materials such as oxides, hydroxides, etc, or they can be naturally occurring minerals such as clays, talcs, or any combination of these. The invention is not limited to the types of powders or raw materials. These can be chosen depending on the properties desired in the body.

Some typical kinds of powder materials are given below. The particle size is given as median particle diameter by Sedigraph analysis, and the surface area is given as $N_2$ BET surface area.

Some types of clay are non-delaminated kaolinite raw clay, having a particle size of about 7–9 micrometers, and a surface area of about 5–7 $m^2/g$, such as Hydrite MP™, those having a particle size of about 2–5 micrometers, and a surface area of about 10–14 $m^2/g$, such as Hydrite PX™, delaminated kaolinite having a particle size of about 1–3 micrometers, and a surface area of about 13–17 $m^2/g$, such as KAOPAQUE-10™ (K10), calcined clay, having a particle size of about 1–3 micrometers, and a surface area of about 6–8 $m^2/g$, such as Glomax LL. All of the above named materials are sold by Dry Branch Kaolin, Dry Branch, Georgia.

Some typical kinds of talc are those having a surface area of about 5–8 $m^2/g$, such as supplied by Barretts Minerals, under the designation MB 96-67.

Some typical aluminas are coarse aluminas, for example, Alcan C-700 series, such as those having a particle size of about 4–6 micrometers, and a surface area of about 0.5–1 $m^2/g$, eg., C-701™, fine alumina having a particle size of about 0.5–2 micrometers, and a surface area of about 8–11 $m^2/g$, such as A-16SG from Alcoa.

One typical kind of silica is that having a particle size of about 9–11 micrometers, and a surface area of about 4–6 $m^2/g$, such as IMSIL™ sold by Unimin Corporation.

Molecular sieves are crystalline substances having pores of size suitable for adsorbing molecules. The molecular sieve can be in the crystallized form or in the ammonium form or hydrogen form, or ion-exchanged with or impregnated with a cation. The molecular sieves can be provided in ion exchanged form or impregnated with cations either before forming into a body or after the product body has formed. The ion-exchange and impregnation methods are well known processes. Such treatments are within the scope of this invention.

Some types of molecular sieves which are preferred for the practice of the present invention are carbon molecular sieves, zeolites, metallophosphates, silicoaluminophosphates, and combinations of these. Carbon molecular sieves have well defined micropores made out of carbon material.

The molecular sieves that are especially suited to the invention are the zeolites. Some suitable zeolites are pentasil, such as ZSM-5, Y, such as ultrastable Y, beta, mordenite, X, such as 13X, or mixtures thereof.

The invention is also suited for mixtures that contain activated carbon or carbon precursors, e.g. thermosetting resins, that can later be carbonized and activated.

The Organic Binder

It is highly desirable that a portion of the organic binder component contribute to the plasticity of the mixture for shaping into a body. An especially preferred plasticizing organic binder for use in these mixtures is one or more cellulose ethers some of which are thermally gellable. Some typical cellulose ether binders according to the present invention are methylcellulose, ethylhydroxy ethylcellulose, hydroxybutyl methylcellulose, hydroxymethylcellulose, hydroxypropyl methylcellulose, hydroxyethyl methylcellulose, hydroxybutylcellulose, hydroxyethylcellulose, hydroxypropylcellulose, sodium carboxy methylcellulose, and mixtures thereof. Methylcellulose and/or methylcellulose derivatives are especially suited as organic binders in the practice of the present invention with methylcellulose, hydroxypropyl methylcellulose, or combinations of these being preferred. Preferred sources of cellulose ethers are Methocel A4M, F4M, F240, and K75M from Dow Chemical Co. Methocel A4M is a methylcellulose binder having a thermal gel point of about 50° C., and a gel strength of 5000 g/cm² (based on a 2% aqueous solution). Methocel F4M, F240, and K75M are hydroxypropyl methylcellulose. Methocels F4M and F240 have thermal gel points of about 54° C. Methocel K75M has a gel point of about 70° C. (all based on a 2% solution in water).

Prior to this invention, in employing wax with thermally gellable binders, the wax melt point had to be below the gel point of the binder if higher torques and pressures were to be avoided. Moreover, a significant problem on rapid drying can result if the wax melts prior to thermal gelation of the binder. This often results in loss of shape or dimensional control.

Although waxes with lower melting points, e.g. <35° C. can be used as long as the evolution of gas (brought about by the effect of pressure and temperature change on the supercritical fluid) after extrusion produces stiffening, a particular advantage of using high melting waxes is that a thermally gellable binder would gel prior to the wax melting and thereby the shape would better be maintained. This is a significant advantage in cases in which heat is employed to accelerate drying. Even without a thermally gelling binder, however, the high melting wax or a non-aqueous supercritical fluid-miscible polymer would result in better dimensional control than otherwise. In fact, the potential exists for them to be an enable for using non-thermally gelling binders. Binders such as hydroxyethyl cellulose, ethylhydroxy ethylcellulose, polyvinyl alcohol, polyethylene oxide, and others actually exhibit excellent extrusion properties but are normally unusable for cellular ceramics due to poor shape (dimensions) retention upon die exit and drying. Incorporation of high melting waxes or polymers, miscible with the supercritical fluid, can stiffen the extrudate sufficiently upon loss of supercritical fluid, that drying without shape loss would be facilitated. In the cases of both waxes and polymers for this invention they would need to be water insoluble, and would have to be solid in the absence of supercritical fluid. To some degree even very high melting waxes and polymers can be employed limited only to their miscibility with the supercritical fluid and their resultant viscosity in this state. It should be noted that use of non-thermally gelling polyvinyl alcohol would reduce the cost of the extrusion binder significantly over e.g. methylcellulose or hydroxypropyl methylcellulose. These cellulose ethers are the most commonly used extrusion binders.

Especially suited as the water-insoluble organic binder component are waxes, polymers, such as for example, polyethylene, polypropylene, ethyl vinyl acetate and other ethylene co-polymers, polybutyl methacrylate, polystyrene and other polystyrene co-polymers, etc., and wax-polymer blends. Low molecular weight wax is advantageous due to the low viscosity when dissolved in supercritical fluid. Because many waxes soften with the supercritical fluid, most having some degree of solubility, a large number of waxes, both high and low melting, can be incorporated uniformly into the extrusion mixture, depending on the properties desired in the final product. Preferably the waxes should either themselves or as compounded with polymers and/or other organic ingredients exhibit water solubility of less than 1% (considered to be water-insoluble), a melting point (ASTM D127-49) of greater than about 60° C., and needle penetration hardness (ASTM D1321-54T, 25° C., 100 g, 5 sec.) of less than about 20. Some waxes that can be used are saturated hydrocarbon waxes such as paraffin, microcrystalline wax, and low molecular weight polyolefin waxes; mineral waxes such as montan, lignite, ozocerite, and ceresin waxes; vegetable waxes such as bayberry, candelilla, carnauba, cotton, ouricury, palm, fir, esparto, rice-oil, flax, and Japan waxes; animal waxes such as beeswax, shellac, spermaceti, and wool waxes; fatty alcohol and fatty acid waxes; fatty acid esters, and glyceride waxes; hydrogenated oil waxes; ketone; amine; amide; and oxazoline waxes. Also suitable are synthetic waxes developed as alternatives to animal source waxes such as synthetic beeswax, synthetic spermaceti wax, etc. Other suitable waxes include synthetic hydrocarbon waxes such as Fischer-Tropsch waxes, and oxidized hydrocarbon waxes. Also, the above waxes can be blended with compatible polymers such as higher molecular weight polyolefins, acrylics, polyesters, cellulosic esters, cellulosic ethers, etc. as well as co-polymers thereof such as ethylene-vinyl acetate, styrene block co-polymers with polyolefins, etc. Some especially suited waxes are paraffin, microcrystalline, carnauba, low molecular weight polyethylene wax, and/or oxidized polyethylene waxes.

The weight percents of the organic binder and vehicle are calculated as superadditions with respect to the non-organic solids by the following formula:

$$\frac{\text{weight of binder, vehicle, or other additives}}{\text{weight units of non-organic solids}} \times 100.$$

The level of water-insoluble organic binder can vary depending on the particular composition and processing. The level should not be too low to compromise effectiveness, nor too high so as to pose a problem with equipment. However, generally the level is an effective amount up to about 15% based on the weight of the powder material, and more typically about 2 to 15%.

Additionally water-insoluble liquid organics such as alkanes (n-hexane, e.g.) can be included to enhance the solubility or diffusion of the supercritical fluid in the wax or non-water-soluble binder. For example, without wishing being bound by theory, we believe that mixtures of low molecular weight waxes such as paraffin, with small amounts of oil such as mineral oil might possibly show a greater stiffening effect because of the co-solvent effect of the mineral oil and supercritical fluid.

The aqueous vehicle content, which is typically water, can vary depending on the type of materials to impart optimum handling properties and compatibility with other components in the mixture. The vehicle content is less than it would be if the supercritical fluid were not used. For example, with water as a vehicle, and $CO_2$ as the supercritical fluid, the amount of water can be reduced by as much as 15%. As a typical example, and it is to be understood that the present invention is not limited to these values, a water content of typically about 29% to about 32% by weight without the $CO_2$ addition would be reduced to about 27% to 28% by weight or lower if feasible.

The dry powder mixture components are first blended. The liquid components are then added with further mixing to form a granular wet batch. This batch is introduced into an extruder where it is further homogenized and de-aired.

The extruder must be one in which the mixture components can be uniformly blended with the supercritical fluid. Thus two stage de-airing single auger extruder, or a twin screw mixer with a die assembly attached to the discharge end are suitable. In the latter, the proper screw elements are chosen according to material and other process conditions in order to build up sufficient pressure to force the batch material through the die. Extrusion temperatures typically range from room temperature to no higher than about 60° C.

The supercritical fluid can be introduced into the extruder in any form that is easy to handle. For example, if supercritical carbon dioxide is used, dry ice can be introduced into the extruder. However, the mixture in the extruder must be maintained in the pressure and temperature range where supercritical carbon dioxide exists so that any carbon dioxide in the extruder regardless of how it was introduced, will convert to and be maintained as supercritical carbon dioxide.

The bodies according to the present invention can have any convenient size and shape and the invention is applicable to all processes in which powder mixtures having a cellulose ether binder are extruded and to the products made therefrom. However, the process is especially suited to production of cellular monolith bodies such as honeycombs. Cellular bodies find use in a number of applications such as catalyst carriers, electrically heated catalysts, filters such as diesel particulate filters, molten metal filters, regenerator cores, etc.

Generally honeycomb cell densities range from 94 cells/$cm^2$ (about 600 cells/$in^2$) to 15 cells/$cm^2$ (about 100 cells/$in^2$). Some examples of commonly used honeycombs in addition to these are, although it is to be understood that the invention is not limited to such, are about 62 cells/$cm^2$ (about 400 cells/$in^2$), or about 47 cells/$cm^2$ (about 300 cells/$in^2$), and those having about 31 cells/$cm^2$ (about 200 cells/$in^2$). Typical wall thicknesses are for example, about 0.15 mm (about 6 mils) for about 62 cells/$cm^2$ (about 400 cells/$in^2$) honeycombs. Wall (web) thicknesses range typically from about 0.1 to about 0.6 mm (about 4 to about 25 mils). The external size and shape of the body is controlled by the application, e.g. in automotive applications by engine size and space available for mounting, etc. Honeycombs having about 15 to about 30 cells/$cm^2$ (about 100 to about 200 cells/$in^2$) and about 0.30 to about 0.64 mm (about 12 to about 25 mil) wall thicknesses are especially suited for diesel particulate filter applications. This invention is especially advantageous for honeycombs having very thin walls, e.g. $\leq 0.13$ mm (5 mils).

The extrudates can then be dried and fired to impart strength to the extrudate, according to known techniques.

The firing conditions depend on the nature of the powder material.

To more fully illustrate the invention, the following non-limiting examples are presented. All parts, portions, and percentages are on a weight basis unless otherwise stated.

Example Of An Extruder

The FIGURE is a schematic diagram of one twin screw extruder which is suitable to the practice of this invention, although it is to be understood that the invention is not limited to this or to other extruders or types and numbers of screw elements.

The FIGURE shows extruder (10) that is divided into a number of extrusion barrel segments, a through j one or more of which make up the various sections according to their function. For example, the segments can each be about 120 mm long. The arrow indicates the direction of flow of material through the extruder. The mixture components except the supercritical fluid are introduced into the extruder through the feed end constructed of barrel segment a, at the inlet end of the extruder. They are conveyed by transfer elements (12) into section (14) made of barrel segments b and c, where they undergo dispersive mixing or plasticizing by twin screw elements (15). The supercritical fluid or material that will be converted to supercritical fluid is introduced at section (16) composed of barrel segments d and e. Dynamic seal (18) placed between sections (14) (at segment c) and (16) (at segment d) prevents supercritical fluid from passing back into the feed and plasticizing section. The plasticized mixture passes through the dynamic seal into section (16). In this section there are several sets of distributive mixing elements, (17), that mix it with the supercritical fluid. Here the mixing is distributive or high shear, by virtue of the relatively high density of twin screws to the total barrel length. The number of screw elements can vary or they can be altered for efficient mixing. The mixture including the supercritical fluid passes into section (20) composed of barrel segment f, having twin screw elements (21). Here there is dispersive or low shear mixing and elongation of the mixture by virtue of the relatively low density of the twin screw elements relative to the total barrel length. The mixture then passes into section (22) made of barrel segments g, h, and i, where the mixture is conveyed by transfer elements (24), and allowed to equilibrate. The mixture passes into section (30) made of barrel segment, j, where the mixture is recombined by screw elements (31) and pumped to and through the extrusion die (not shown) out of the extruder.

A ventport stuffer is a piece of equipment that is ordinarily used on an extruder when the removal of air from the extrudate is required. This equipment is placed on the extruder at a location after the extrudate is plasticized. For example, the ventport would be placed in sections h and/or i and attached to a vacuum line. The ventport stuffer operates on its own drive motor and can be of either single auger or twin screw co-rotation auger design. With use of supercritical fluids, the ventport and ventport stuffer are eliminated. Any air and supercritical fluids exit through the die.

EXAMPLE 1

The following materials are dry blended:

| | |
|---|---|
| Alumina | 12 kg. |
| Clay | 36 kg. |
| Talc | 40 kg. |
| Methylcellulose | 4 kg. |
| Paraffin wax (m.p. 60° C.) | 5 kg. |
| Sodium stearate | 1 kg. |

About 28 kg. of water is added to the dry blended materials. The resulting mixture is introduced into a twin screw extruder such as that described above. Carbon dioxide is added at a rate so as to result in a level of $CO_2$ of about 3 to 5 vol. % of the total batch. The batch is extruded. The extrudate is dried and fired to form cordierite.

EXAMPLE 2

The following batch is useful for extruding cellular bodies.

| | |
|---|---|
| Alumina | 40 kg. |
| Clay | 47 kg. |
| Kraton 1650 styrene-block polymer | 4 kg. |
| Hexadecanol or octadecanol | 8 kg. |
| Oleic acid and/or stearic acid | 1 kg. |

The Kraton is plasticized in the fatty alcohol (which can, in actuality be any fatty alcohol (usually $C_{18}$–$C_{20}$), at about 150° C. in a planetary mixer. After plasticizing, it can be granulated or pulverized and then added as a batch ingredient.

The batch is extruded through an extruder as described above and as in Example 1. Mullite bodies are made by firing the extrudate to about 1500° C.

EXAMPLE 3

The following batch is useful for extruding cellular bodies.

| | | |
|---|---|---|
| Talc 95-27 | 40.8 | kg. |
| Glomax LL | 27 | kg. |
| Hydrite MP | 15.35 | kg. |
| Alcan alumina C701 | 15.05 | kg. |
| IMSIL silica | 1.8 | kg. |
| Methocel F240 | 1.4 | kg. |
| Sodium stearate | 0.4 | kg. |
| Airvol 540S PVA | 1.8 | kg. |
| Carnauba wax | 0.9 to 1.8 | kg. |

The batch is extruded as described above and in Example 1.

It should be understood that while the present invention has been described in detail wish respect to certain illustrative and specific embodiments thereof, it should not be considered limited to such but may be used in other ways without departing from the spirit of the invention and the scope of the appended claims.

We claimed:

1. A method of making a shaped article, the method comprising:

a) forming an aqueous mixture consisting essentially of inorganic powder material selected from the group consisting of ceramic, glass, glass-ceramic, metal, molecular sieve, and combinations thereof, supercritical fluid, organic binder component consisting essentially of a cellulose ether, and a wax-containing component that is essentially insoluble in water, has a melting point of greater than about 60° C. and a needle penetration hardness of less than about 20, and aqueous vehicle; and b) extruding the mixture into a shaped article; and c) drying and heat treating the shaped article to impart strength thereto.

2. A method of claim 1 wherein the wax is selected from the group consisting of microcrystalline wax, carnauba wax, paraffin wax, low molecular weight polyethylene wax, oxidized polyethylene waxes and combinations thereof.

3. A method of claim 1 wherein said supercritical fluid is supercritical carbon dioxide.

4. A method of claim 1 wherein the cellulose ether binder is selected from the group consisting of methylcellulose, methylcellulose derivatives, and combinations thereof.

5. A method of claim 1 wherein the mixture is extruded into a honeycomb structure.

* * * * *